US009114435B2

(12) United States Patent
Despres

(10) Patent No.: US 9,114,435 B2
(45) Date of Patent: Aug. 25, 2015

(54) SYSTEM FOR STORING OBJECTS IN PREDETERMINED STORAGE CONTAINERS

(71) Applicant: Jean-Albert Despres, Souesmes (FR)

(72) Inventor: Jean-Albert Despres, Souesmes (FR)

(73) Assignee: Jean-Albert Despres, Souesmes (FR)

( * ) Notice: Subject to any disclaimer, the term of this patent is extended or adjusted under 35 U.S.C. 154(b) by 0 days.

(21) Appl. No.: 14/200,740

(22) Filed: Mar. 7, 2014

(65) Prior Publication Data

US 2014/0374215 A1 Dec. 25, 2014

Related U.S. Application Data

(63) Continuation of application No. PCT/FR2012/051986, filed on Sep. 5, 2012.

(30) Foreign Application Priority Data

Sep. 9, 2011 (FR) ..................................... 29 79903

(51) Int. Cl.
*B65G 1/00* (2006.01)
*B07C 5/34* (2006.01)

(52) U.S. Cl.
CPC .................................... *B07C 5/3412* (2013.01)

(58) Field of Classification Search
CPC ........... B65G 1/00; B65G 1/045; B65G 1/137
USPC ................................ 198/347.1, 347.2, 347.3
See application file for complete search history.

(56) References Cited

U.S. PATENT DOCUMENTS 6,671,580 B2 * 12/2003 Campbell et al. ............ 700/245
6,762,382 B1 * 7/2004 Danelski ................. 198/370.04
7,861,844 B2 * 1/2011 Hayduchok et al. ....... 198/370.1
8,104,601 B2 * 1/2012 Hayduchok et al. ....... 198/347.1

* cited by examiner

*Primary Examiner* — James R Bidwell
(74) *Attorney, Agent, or Firm* — Christopher P. Maiorana, PC

(57) ABSTRACT

The invention relates to a system for storing objects, such as surgical instruments, in predetermined storage containers (4). The system includes a conveyor (1) for transporting objects (3) placed on the conveyor to a camera (12) for recognizing the objects by reading an identification code provided on each object, and a device (6) for transporting each object (3) from the conveyor to the storage container for which it is intended. The system is characterized in that it includes a device (5) for transferring each recognized object (3) from the conveyor (1) into a box (8) for transporting the object into the container for which it is intended, and a device for supporting this transport box (8), which is movable according to a stepwise movement.

20 Claims, 4 Drawing Sheets

Fig.3
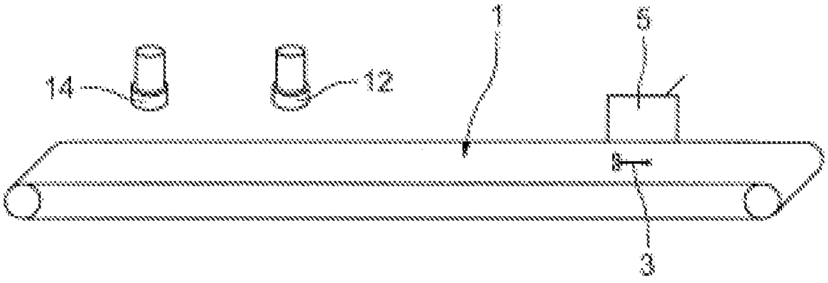
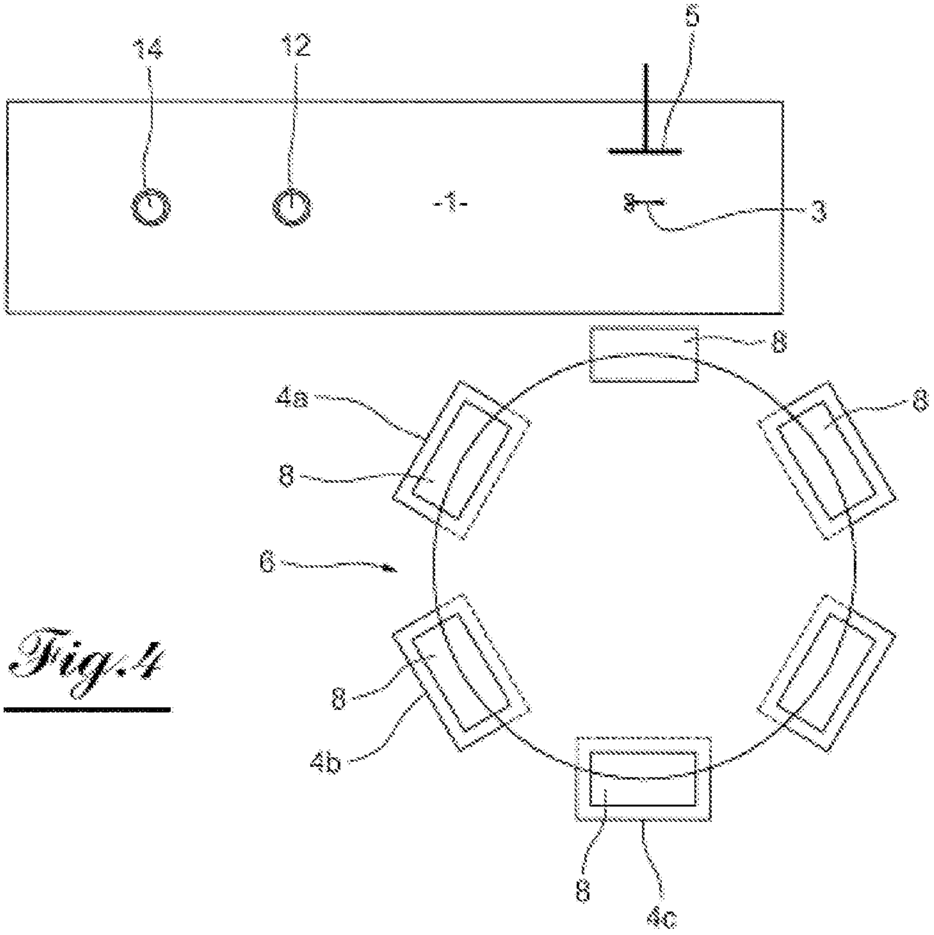
Fig.4

SYSTEM FOR STORING OBJECTS IN PREDETERMINED STORAGE CONTAINERS

This application is a continuation of International Application PCT/FR2012/051986, with an International Filing Date of Sep. 5, 2012, which claims the benefit of French Patent No. 2979903, filed Sep. 9, 2011, each of which is incorporated by reference in their entirety.

The invention relates to a system for storing objects, such as surgical instruments, in predetermined storage containers, comprising a conveyor for transporting objects placed on the conveyor to a camera for recognizing the objects by reading a code provided on the objects and a device for storing each object in the storage container intended for the object.

It is desirable that the storage system has a simple structure as well as an easy to use operation while ensuring safety. An operation consisting of storing all of the instruments that are part of a set for a specific use, for example for a determined surgical procedure, in a container, is a complex operation. Systems that meet the above requirements do not exist. Therefore, an object of the invention is a system for storing objects in predetermined storage containers that has a simple structure, is easy to use ensures safety and performs the complex operation.

A system according to the invention is characterized in that the system comprises a device for transferring or discharging each recognized object from the conveyor to transport boxes for transporting the recognized object into the storage container for which the recognized object is intended, and a device for supporting the transport boxes, which is movable according to a stepwise movement, each step of the transport device corresponding to a one step ahead movement of the conveyor, during which the object has been recognized by the recognition camera.

According to a feature of the invention, the storage system is characterized in that the transport boxes are mounted on a movable support means, designed as a carousel, having at a periphery of the moveable support means, the transport boxes whose number is least equal to the number of storage containers.

According to another feature of the invention, the storage system is characterized in that the transport boxes are mounted on a movable support means moving linearly according to a direction of movement and which carries out at least as many steps as there are storage containers.

According to yet another feature of the invention, the storage system is characterized in that the transport device comprises at least one more transport box than there are storage containers. The additional transport box is adapted to discharge into a wastebasket the instruments that could not be discharged in one of the storage containers.

According to yet another feature of the invention, the storage system is characterized in that each transport box is pivotally mounted on the support so as to be able to pivot between a position for receiving and transporting one of the objects and a position for discharging one of the objects in one of the storage containers.

According to yet another feature of the invention, the storage system is characterized in that the system further comprises, a camera upstream to the recognition camera for capturing the placement of the objects on the conveyor in positions allowing object recognition by the recognition camera.

According to yet another feature of the invention, the storage system is characterized in that the order and the number of the storage containers are determined according to the arrival order of the recognized objects on the transport device.

According to yet another feature of the invention, the storage system is characterized in that one of the storage containers becomes intended for a set of the objects corresponding to a first of the recognized objects. The storage container intended for the set is taken away by one-step of the transport device from the receiving position of the objects to be stored.

According to yet another feature of the invention, the storage system is characterized in that the coordinates and the content of the storage containers are advantageously displayed on a display screen associated with the recognition camera.

The invention will be better understood and other objects, features, details and advantages thereof will appear more clearly in the explanatory description which follows with reference to the accompanying schematic drawings that are given by way of example of an embodiment of the invention only and in which:

FIGS. 3 and 4 are two schematic views of the system according to the invention shown in FIGS. 1 and 2.

The invention will be described by way of an example of an application of the system to a storage system configured to store surgical instruments in predetermined storage containers adapted such that the storage containers each contain a set of selected instruments for a specific use such as surgery. Of course, the invention is not limited to one specific application.

Figure 1:
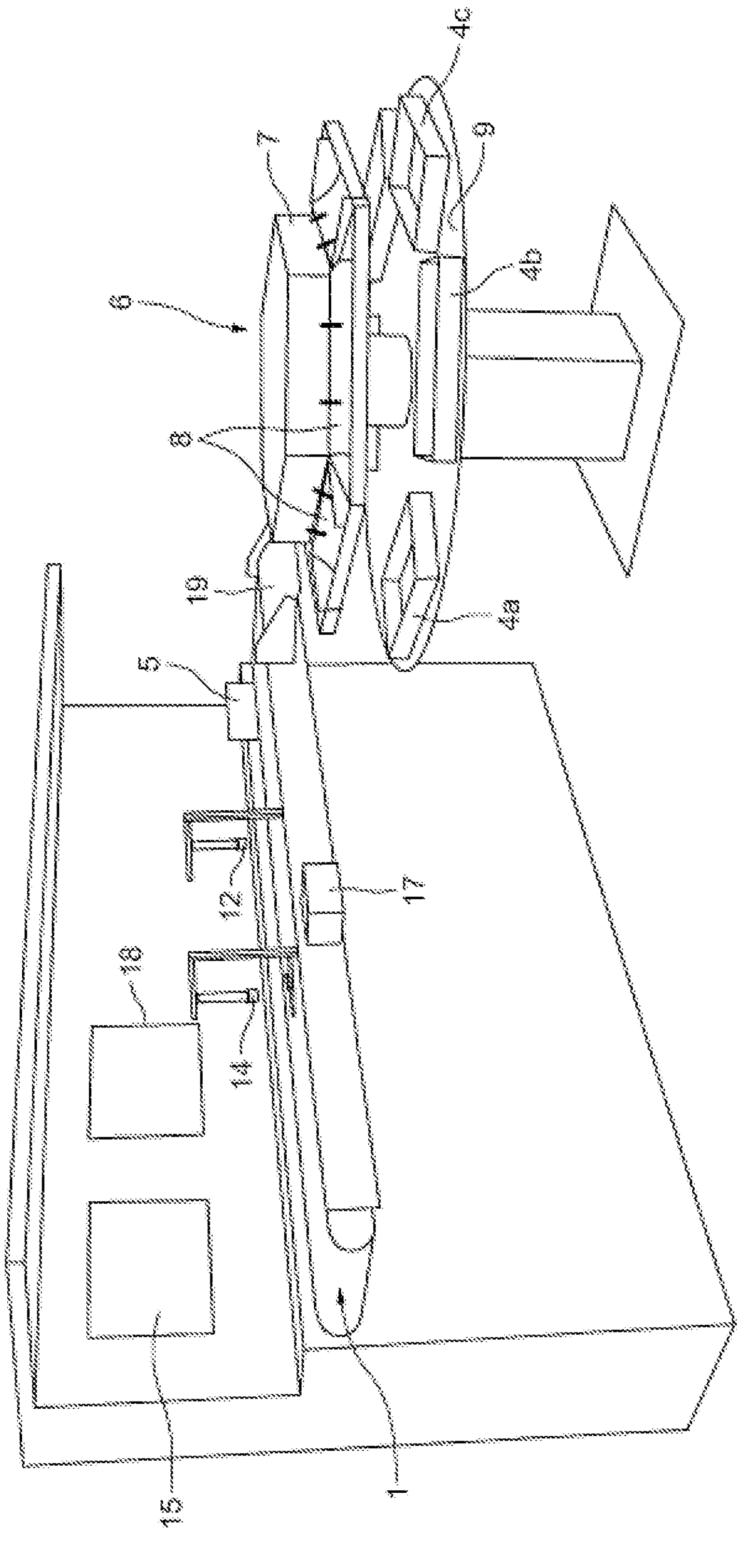
FIG. 1 is a perspective view of the storage system according to the invention.

According to FIGS. 1, 3, and 4, a system according to the invention comprises a conveyor 1 designed as an endless belt for receiving surgical instruments 3. The surgical instruments 3 may be stored in a designated storage container 4. The conveyor 1 is intended to transport those instruments 3 from a placement location on the conveyor 1 to a transfer point of the conveyor 1. A transfer or discharge device 5 may transport the instruments 3 from the conveyor 1 to a device 6. The device 6 may transport the transferred instruments in an assigned storage container.

Figure 2:
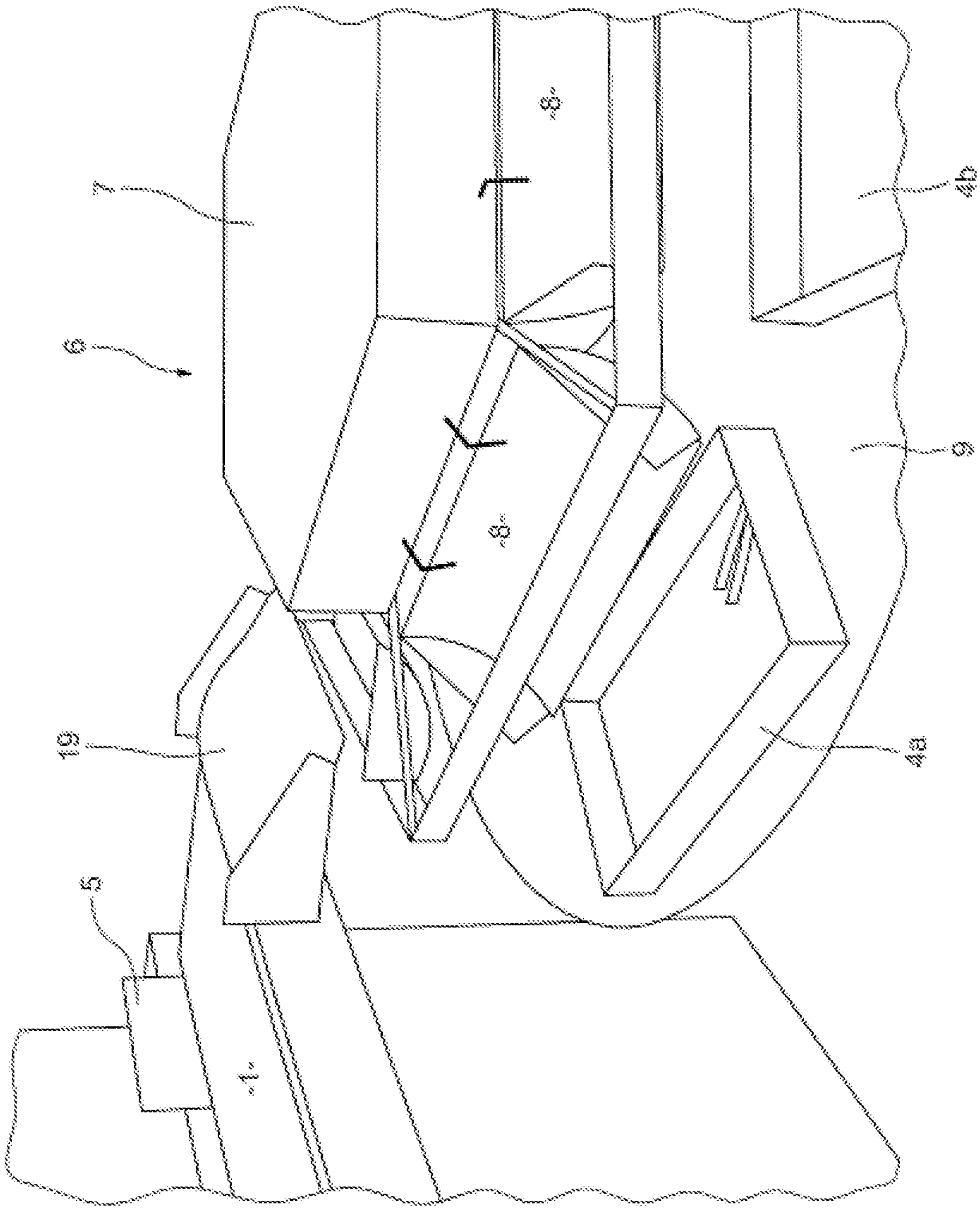
FIG. 2 is a perspective view, on a larger scale, of portion 2 depicted in FIG. 1.

In the example shown, the transport device 6 comprises a support means 7 designed as a carousel. At a periphery of the support means 7, there may be a number of transport boxes 8. Each of the transport boxes 8 may receive an instrument 3 transferred from the conveyor 1. According to the invention, the carousel moves in a stepwise manner. The transport boxes 8 may be evenly distributed at the periphery of the carousel. As particularly seen in FIG. 1, at each stop position of the stepwise movement of the support means 7, except at the area corresponding to the angular position for receipt of the discharged objects 3 from the discharge device 5, a storage container 4 is shown. The storage containers 4 are represented in the figures as a box. The storage containers 4 may be placed on a support table 9. The tool 3 lying in one of the transport boxes 8 can be transferred into one of the storage containers 4. Therefore, given a number N of transport boxes 8, the system comprises N-1 storage containers. As shown in FIG. 2, the transport boxes 8 are mounted on the support means 7 to be pivotable between a receiving and transport position and a discharge position. The discharge position may be for discharging the object 3 from the transport box 8 to the corresponding storage container 4, on the carousel; According to the invention, each of these storage containers 4 is intended to contain a set of surgical instruments established for a predetermined use (e.g., a surgical procedure).

Figure 5:
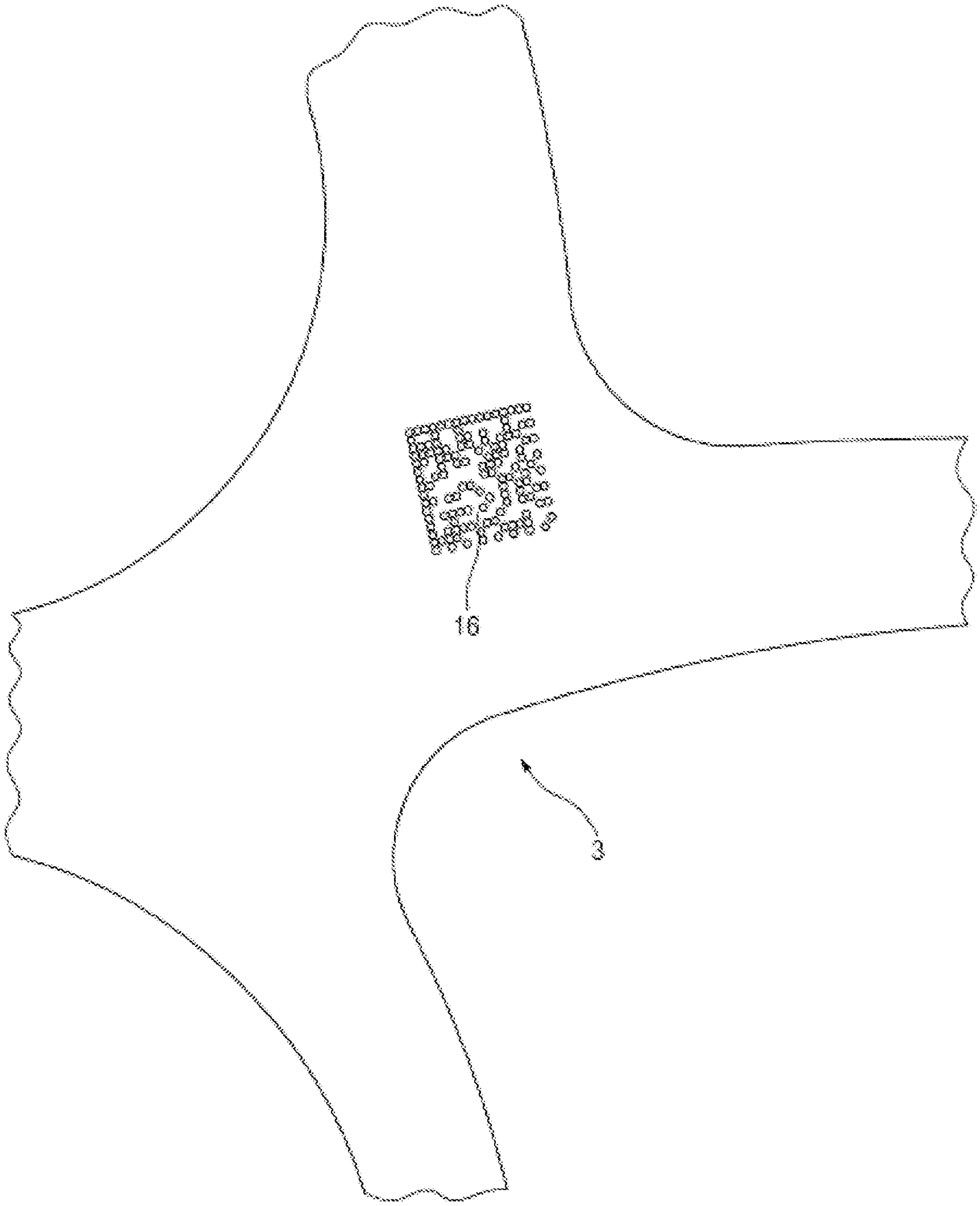
FIG. 5 is a view of a portion of an instrument provided with an identification code.

In order to be able to carry out the storage of the instruments 3 in such an orderly manner in the storage containers 4, the system is equipped with a device for recognizing the instruments 3. The instruments 3 may be recognized by means of a camera 12 configured to recognize the instruments 3 by reading a specific code provided on each of the instruments 3. FIG. 5 shows, as an example, one of the instruments 3 encoded by a number of encoding points 16. The encoding points 16 may be distributed in an unique way specific to each of the instruments 3. For example the encoding points 16 may be a square area of the surface of the instrument 3. Of course other encoding means could be implemented.

The camera 12 for recognizing instruments, hereinafter designated as decoding camera, is upstream of the transfer point.

In the example shown, the system according to the invention comprises an additional camera 14. The camera 14 may be configured to capture an image of the instrument 3 on the conveyor 1 in a field of view of the camera 14. The camera 14 may be configured to reproduce the image on a display screen 15. The camera 14 allows placing the instrument 3 on the conveyor 1 so that the area of the instrument 3 having the encoding points 16 is located in the center of the screen 15 and therefore in a position allowing the decoding camera 12 to read the encoding points 16 in an optimal manner when the instrument 3 passes through a field of vision of the camera 12.

In the exemplary embodiment of the invention, the surgical instruments to be stored in the storage containers 4 are arranged on the conveyor by an operator who is provided with a conveyor control panel 17.

The operation of the system according to the invention as shown in the figures and described above will be described below.

An operator may place a first of the instruments 3 (e.g., designated by 3*a* to facilitate the understanding of the invention) on the conveyor 1 with the area of the instrument 3*a* having the encoding points 16 in the field of view of the recognizing camera 12. The operator may monitor a position of the instrument 3*a* on the display screen 15. The operator may press a button on the control panel 17 that sets the conveyor 1 in motion. The conveyor 1 may carry the instrument 3*a* under the decoding camera 12 and to the transfer device 5.

In order to facilitate the positioning of the instruments 3 on the conveyor 1, each of the instruments 3 may have the characterizing code (e.g., the encoding points 16) on both sides. For example, the upwardly oriented face of the instrument 3 and the face of the instrument 3 resting on the conveyor 1 may both have the encoding points 16.

When the tool 3*a* passes under the decoding camera 12, the decoding camera 12 may read and recognize the code (e.g., based on the encoding points 16). For example, the instrument 3*a* may be identified based on the code. When the instrument 3*a* comes in front of the transfer device 5, the transfer device 5 may move the instrument 3*a* perpendicularly to the axis of the conveyor and push the instrument 3*a* on the sloped plane 19. The sloped plane 19 may allow the instrument 3*a* to slide in the transport box 8 of the carousel (e.g., the support means 7), which is in front of the sloped plane 19 (e.g., designated by 8*a* ).

The operator may place a second of the instruments 3 (e.g., designated by 3*b*) on the conveyor 1, in the field of vision of the capturing camera 14. After checking that the instrument 3*b* is properly positioned (e.g., the area of the instrument 3*b* having the code is in the center of the image reproduced on the display screen 15), the operator may press the button of the control panel 17. Pressing the button on the control panel 17 may start the conveyor 1 that moves then the tool 3*b* to the decoding camera 12. The decoding camera 12 may recognize (e.g., identify) the instrument 3*b* (e.g., based on the encoding points 16. Thereafter, the conveyor 1 may move the instrument 3*b* to the transfer device 5. Meanwhile, a one-step rotation of the carousel may move the transport box 8*a* that had previously received the first tool 3*a*, (e.g., at the end of the first step, as described above) so that the transport box 8*a* is positioned above the first storage container 4*a*. When the carousel is positioned with the transport box 8*a*, having the instrument 3*a* above the storage container 4*a*, the instrument 3*a* may be discharged into the first storage container 4*a*. The first storage container 4a may become the container designated (e.g., intended) for a set of instruments to which the first tool 3*a* belongs (e.g., corresponds). At the end of the rotation step of the carousel, an empty transport box 8 (e.g., designated by 8*b*) may be positioned in front of the discharge device 5. The discharge device 5 may then push the second instrument 3*b* in the transfer box 8*b*.

The operator may position a third tool 3*c* on the conveyor 1, in the field of view of the capturing camera 14. The operator may press the button on the control panel 17 for controlling a movement of the conveyor 1. During the time taken to move the instrument 3*c* to the transfer device 5, the carousel may carry out a new rotation step such that an empty transport box 8 (e.g., now designated by 8*c*) is moved in front of the discharge device 5. During the new rotation step, the transport box 8*b* containing the second instrument 3*b* may be moved to a position above the first storage container 4*a*. If the second instrument 3*b* is part of the set corresponding to a set of the instruments 3 that the first storage container 4*a* is designated to receive, the second instrument 3*b* may be discharged into the storage container 4*a*. If the second instrument 3*b* is part of another set, the second instrument 3*b* may be discharged into the second storage container 4*b*. The second instrument 3*b* may be discharged into the second storage container 4*b* at the end of the second rotation step made during the recognition of the third instrument 3*c*. The discharge device may push the third instrument 3*c* in the third transport box 8*c*. Thus, the storage container 4*b* may become the storage container designated for all instruments of the set corresponding to the second instrument 3*b*.

Each instrument recognizing step may cause the carousel to rotate one step. The storage containers 4 may be configured to receive different sets of the instruments 3. The designation of the storage containers 4 for the various sets of the instruments 3 may be determined as the recognition of the instruments 3 by the decoding camera 12 is performed. The set corresponding to the first instrument 3*a* be may be received in the first storage container 4*a*. Each of the instruments that are part of the set corresponding to the instrument 3*a* will then be discharged into the first storage container 4*a*. The first of the recognized instruments 3 that is not part of the set corresponding to the instruments stored in the first storage container 4*a* may be placed in the second storage container 4*b*. The first of the recognized instruments 3 that is part of a third set may be discharged into the third storage container 4*c* and so on.

The composition of the storage containers 4 and an identification number may be displayed on a screen 18 of the decoding camera 12. Displaying the composition of the storage containers 4 and the identification number may be to ensure that the invention allows full traceability of the instruments 3.

Various modifications may be made to the invention. For example, the decoding camera 12 may be mounted movably in the movement directions of the conveyor 1 and perpendicular to the conveyor 1. Movably mounting the camera 12 may allow the decoding camera 12 to be able to be optimally placed over the encoding area 16 of each of the instruments 3 under the control of the capturing camera 14. One might also consider using only one camera that may be advantageously designed to be able to position correctly, automatically, over the instruments 3 to perform the object recognition. The time needed by the carousel to perform a one-step rotation may then be determined by the movement of the recognized, that is decoded, instruments 3 to the discharge device 5. The movement of the conveyor 1 may then be triggered at the end of the recognition operation of the camera or by any other suitable manner. One could also consider making the system fully automatically run without the operator. In the fully automatically run example, a one-step movement of the conveyor 1 may then ensure the movement of the instrument 3 from a location of placement on the conveyor 1 to the transfer/discharge device 5. The movement step of the conveyor 1 may trigger the one-step movement of the carousel. One may also replace the carousel by a device that moves the transport boxes 8 linearly, in a stepwise manner, to discharge the instruments 3 in the storage containers 4 that may be suitably aligned. In addition to the storage containers 4, the system may also comprise a waste box for receiving the instruments 3 that could not be placed in one of the storage containers 4, for any reason. One could also consider, without departing from the scope of the invention, determining which of the storage containers 4 will be filled, upstream to the storage containers 4, according to an appropriate software.

The invention claimed is:

1. A system for storing objects, such as surgical instruments, in predetermined storage containers (4), comprising:

a conveyor (1) for transporting objects (3) placed on the conveyor (1) to a recognition camera (12) for recognizing the objects (3) by reading an identification code provided on each of the objects (3);

a transport device (6) for transporting each of the objects (3) from the conveyor (1) to one of the storage containers (4) for which the recognized object (3) is intended; and a transfer device (5) for transferring each recognized object (3), from the conveyor (1) to transport boxes (8) for transporting the recognized object (3) into the storage container (4) for which the recognized object (3) is intended, wherein (i) the transport boxes (8) are mounted on a movable support means (7), designed as a carousel having at a periphery of the movable support means (7) the transport boxes (8) whose number is at least equal to a number of the storage containers (4), and (ii) the transport device (6) supports the transport boxes (8), which is movable according to a stepwise movement, each step of the transport device (6) corresponding to a one step ahead movement of the conveyor (1), during which the object (3) has been recognized by the recognition camera (12).

2. The system according to claim 1, wherein the transport boxes (8) are mounted on the movable support means (7) configured to (i) move linearly according to a forward movement and (ii) carry out at least as many steps as there are storage containers (4).

3. The system according to claim 1, wherein (i) the transport device (6) comprises at least one more transport box (8) than there are storage containers (4), and (ii) the at least one more transport box (8) is adapted to discharge into a waste container the objects (3) that could not be discharged in one of the storage containers (4).

4. The system according to claim 1, wherein each transport box (8) is pivotally mounted on the support means (7) so as to be able to pivot (i) between a position for receiving and transporting one of the objects (3) and (ii) a position for discharging one of the objects (3) in one of the storage containers (4).

5. The system according to claim 1, further comprising a camera 14, upstream to the recognition camera (12), for capturing a placement of the objects (3) on the conveyor (1) in positions allowing object recognition by the recognition camera (12).

6. The system according to claim 1, wherein an order and a number of the storage containers (4) are determined according to an arrival order of the recognized objects (3) on the transport device (6).

7. The system according to claim 6, wherein (i) one of the storage containers (4) becomes intended for a set of the objects (3), said set corresponding to a first of the recognized objects (3) (ii) said storage container intended for said set is taken away by one-step of the transport device (6) from a receiving position of the objects (3) to be stored.

8. The system according to claim 1, wherein coordinates and content of the storage containers (4) are advantageously displayed on a display screen (15) associated with the recognition camera (12).

9. A system for storing objects, such as surgical instruments, in predetermined storage containers (4), comprising:

a conveyor (1) for transporting objects (3) placed on the conveyor (1) to a recognition camera (12) for recognizing the objects (3) by reading an identification code provided on each of the objects (3);

a transport device (6) for transporting each of the objects (3) from the conveyor (1) to one of the storage containers (4) for which the recognized object (3) is intended; and a transfer device (5) for transferring each recognized object (3), from the conveyor (1) to transport boxes (8) for transporting the recognized object (3) into the storage container (4) for which the recognized object (3) is intended, wherein (i) the transport boxes (8) are mounted on a movable support means (7) configured to (a) move linearly according to a forward movement and (b) carry out at least as many steps as there are storage containers (4) and (ii) the transport device (6) supports the transport boxes (8), which is movable according to a stepwise movement, each step of the transport device (6) corresponding to a one step ahead movement of the conveyor (1), during which the object (3) has been recognized by the recognition camera (12).

10. The system according to claim 9, wherein (i) the transport device (6) comprises at least one more transport box (8) than there are storage containers (4), and (ii) the at least one more transport box (8) is adapted to discharge into a waste container the objects (3) that could not be discharged in one of the storage containers (4).

11. The system according to claim 9, wherein each transport box (8) is pivotally mounted on the support means (7) so as to be able to pivot (i) between a position for receiving and transporting one of the objects (3) and (ii) a position for discharging one of the objects (3) in one of the storage containers (4).

12. The system according to claim 9, further comprising a camera 14, upstream to the recognition camera (12), for capturing a placement of the objects (3) on the conveyor (1) in positions allowing object recognition by the recognition camera (12).

13. The system according to claim 9, wherein an order and a number of the storage containers (4) are determined according to an arrival order of the recognized objects (3) on the transport device (6).

14. The system according to claim 13, wherein (i) one of the storage containers (4) becomes intended for a set of said objects (3), said set corresponding to a first of said recognized objects (3) and (ii) said storage container intended for said set is taken away by one-step of the transport device (6) from a receiving position of the objects (3) to be stored.

15. The system according to claim 9, wherein coordinates and content of the storage containers (4) are advantageously displayed on a display screen (15) associated with the recognition camera (12).

16. A system for storing objects, such as surgical instruments, in predetermined storage containers (4), comprising:

a conveyor (1) for transporting objects (3) placed on the conveyor (1) to a recognition camera (12) for recognizing the objects (3) by reading an identification code provided on each of the objects (3);

a transport device (6) for transporting each of the objects (3) from the conveyor (1) to one of the storage containers (4) for which the recognized object (3) is intended;

a transfer device (5) for transferring each recognized object (3), from the conveyor (1) to transport boxes (8) for transporting the recognized object (3) into the storage container (4) for which the recognized object (3) is intended, wherein the transport device (6) supports the transport boxes (8), which is movable according to a stepwise movement, each step of the transport device (6) corresponding to a one step ahead movement of the conveyor (1), during which the object (3) has been recognized by the recognition camera (12); and a camera 14 upstream to the recognizing camera (12) for capturing a placement of the objects (3) on the conveyor (1) in positions allowing object recognition by the recognition camera (12).

17. The system according to claim 16, wherein (i) the transport device (6) comprises at least one more transport box (8) than there are storage containers (4), and (ii) the at least one more transport box (8) is adapted to discharge into a waste container the objects (3) that could not be discharged in one of the storage containers (4).

18. The system according to claim 16, wherein each transport box (8) is pivotally mounted on a support means (7) so as to be able to pivot (i) between a position for receiving and transporting one of the objects (3) and (ii) a position for discharging one of the objects (3) in one of the storage containers (4).

19. The system according to claim 16, wherein an order and a number of the storage containers (4) are determined according to an arrival order of the recognized objects (3) on the transport device (6).

20. The system according to claim 16, wherein coordinates and content of the storage containers (4) are advantageously displayed on a display screen (15) associated with the recognition camera (12).

* * * * *